Patented June 18, 1929.

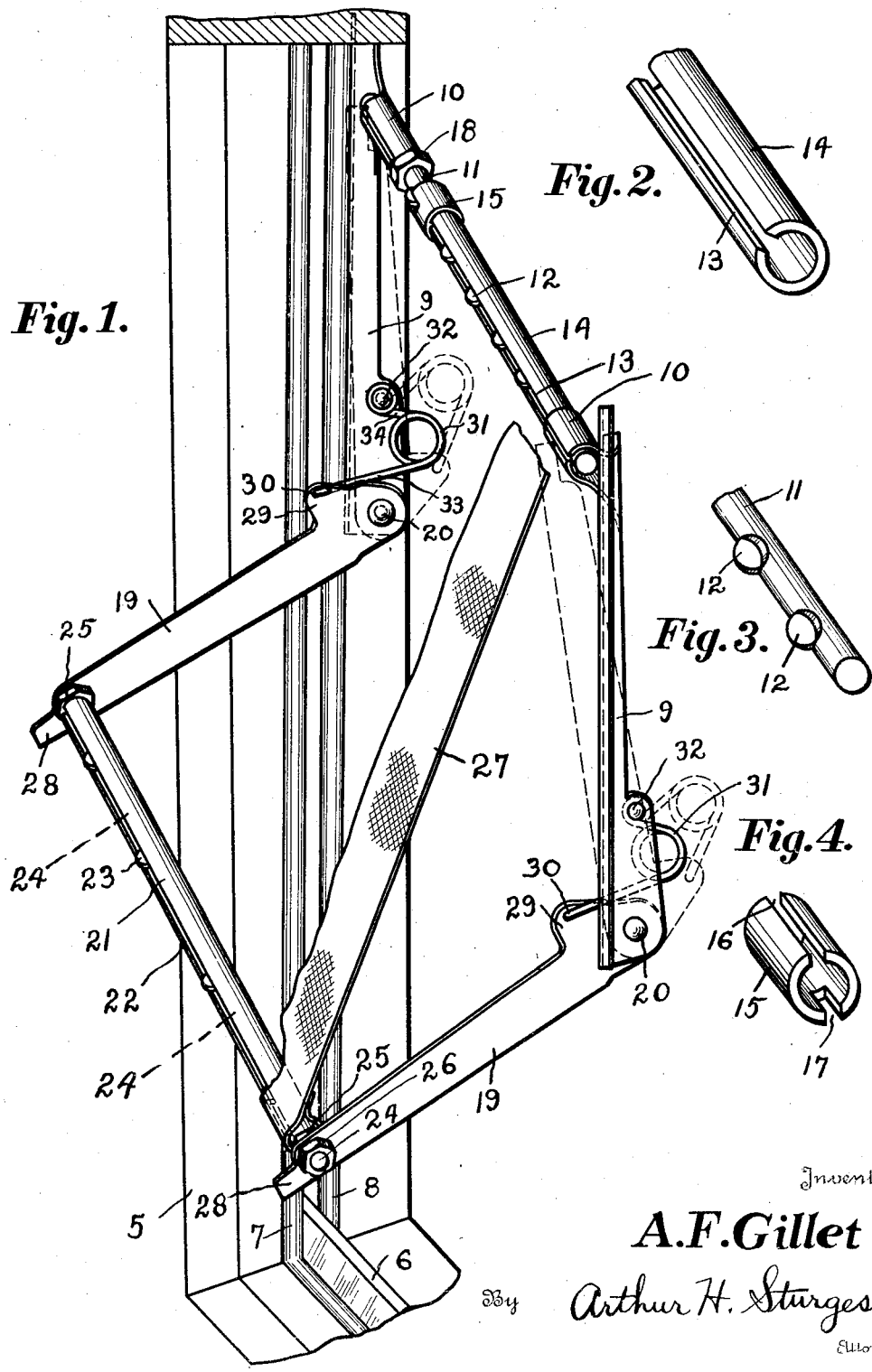

1,717,922

UNITED STATES PATENT OFFICE.

ALEXIS F. GILLET, OF OMAHA, NEBRASKA, ASSIGNOR TO JUBILEE MANUFACTURING COMPANY, OF OMAHA, NEBRASKA, A CORPORATION OF NEBRASKA.

AUTOMOBILE AWNING AND FOLDABLE FRAME.

Application filed February 13, 1928. Serial No. 254,009.

The present invention relates to improvements in automobile awnings and foldable frame constructions therefor, and has for an object to provide an improved foldable frame construction which may be maintained either in the rigid lowered position for stretching the canvas awning, or in the rigid folded position to avoid rattling and objectionable noise, which would otherwise occur due to the movement of the vehicle.

Another object of the invention is to provide an improved hinged arm construction in an awning frame and an improved spring construction cooperating with the arm construction whereby to yieldably hold the arms and fabric under tension in the lowered position of the awning, and to hold the parts against movement in the collapsed condition.

Other objects of the invention are to provide a simple form of awning frame and a simple form of spring construction, the parts being so disposed, related and arranged that the operation of raising and lowering the awning will be a simple one and accomplished with a minimum of attention on the part of the occupant of the vehicle, and when the awning is in the lowered position, the fabric will be held taut and against rippling or flapping in the wind which would be a source of nuisance in a vehicle.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary perspective view, with parts broken away and parts shown in section, of an improved awning construction according to the present invention shown as applied to a window frame.

Figure 2 is a fragmentary perspective view of a sleeve employed.

Figure 3 is also a fragmentary perspective view of a form of rod employed, and

Figure 4 is a perspective view of a form of collar employed.

Referring more particularly to the drawings, 5 designates a window casing, such for instance as the casing about an automobile window; the vertically shiftable glass of which is shown at 6 as being adjustable between the felt strips 7 and 8.

To the sides of the window frame or casing are attached two rails 9 having brackets 10 at their upper portion to receive the end of a rod 11 and an end of a sleeve 14, the rod being shown in Figure 3 and having projections 12 thereon to extend slidably through the slot 13 in the sleeve 14, shown in Figure 2. The sleeve is secured to a bracket 10 by any suitable means such as by crimping.

On the sleeve 14 is mounted a rotary collar 15 having a slot 16 extending from end to end thereof and a recess 17 spaced angularly from the slot and opening through one edge of the collar. When the collar is turned to the position where the slots 16 aline with the slots 13 of the sleeve 14, then the rod 11 may be adjusted in and out, the projections 12 passing freely through both slots. After the adjustment has been effected, the sleeve 15 is rotated, the sleeve being of a length to fit between adjacent projections 12 of the rod. Such sleeve is rotated until the adjacent projections 12 can be shifted into the recess 17, which will prevent further inward movement of the rod 11. The outer end of the rod is provided with a nut 18 to take against the bracket 10. This construction is shown more particularly in my co-pending application entitled Extensible frames for automobile awnings, filed of even date herewith, Serial No. 254,008, Patent No. 1,717,921, June 18, 1929.

Arms 19 are pivoted, as indicated at 20, to the lower portions of the rails 9. These arms carry at their outer ends a sleeve 21 having a longitudinal slot 22 through which project the lugs 23 on rods 24 which extend through the sleeve and are adjustable axially therein, such rods being held as by the nuts 25 and 26 to the outer free ends of the arms 19. A canvas or awning fabric 27 is attached in a well known manner to the sleeves 14 and 21, the material of the canvas being looped over and formed in the casings about the sleeves. The free ends of the arms 19 beyond the sleeve 21 are provided with the stop fingers 28 adapted to strike the brackets 10 in the raised position of the parts, shown in dotted lines in Figure 1. The arms are provided with offset or bell crank portions 29 to which are affixed the ends 30 of springs having their intermediate portions coiled into one or more convolutions 31 and being affixed as indicated at 32 to the rails 9. It will be noted that the spring arms 33 and 34 extend off at substantially tangents to the helices 31 and to the same side of the helices so that the helices 31 is offset and can be swung up without interference to the dotted line position.

In operation, the helices 31 or series of convolutions exert an elastic and expansive action on the spring arms 33 and 34, tending to spread these arms, which will have the effect, when the parts are in the full line position, shown in Figure 1, to urge the arms 19 downwardly about the pivots 20. This downward movement of the arms will be limited only by the awning fabric 27, which is thus subject to a yielding but strong pressure from the springs, acting to maintain the fabric chiefly stretched which is of advantage in resisting flapping and rippling in the high winds created by automobile traffic. On the other hand, in the dotted line position shown in Figure 1 the offset parts 29 of the arms will be moved past the vertical line through the pivot points 20, so that the expansive force of the springs are felt inwardly of the pivot points, thus the action being to tend to maintain the arms 19 raised and with the stop fingers 28 rigidly held against the brackets 10 resisting rattling of the parts. The arms will be swung out of either position by the application of slight force for a small angular distance whereupon the spring arrangement will have past the dead center and will perform the remaining opening movement automatically.

This is of value in order to divert the attention of the driver of the vehicle for only as small a fraction of time as necessary to cause the lowering or raising of the awning.

I do not wish to be restricted to the size, form, and proportions of the various parts, and obviously changes could be made in the construction herein described without departing from the spirit of the invention, it being only necessary that such changes fall within the scope of the appended claims:—

What is claimed is:—

1. In a folding awning frame, a bracket for engagement with the window frame, an arm pivoted at one end to the lower portion of the bracket and adapted to swing upwardly against the inner side of the bracket and to swing outwardly and downwardly therefrom, said arm having intermediate its ends and adjacent to said pivoted end an edgewise projection extending upwardly from the arm when the latter is swung forwardly and downwardly and which extends rearwardly from the arm and the bracket when the arm is swung upwardly against the bracket and a flat helical spring disposed with its ends projecting forwardly at the inner side of the bracket, means for pivotally connecting the one end of the spring to the bracket at a point above the pivoted end of the arm, and the other end of the spring being relatively long and extending over the pivoted end of the arm and having pivotal connection with the projection on the arm, whereby when said arm is swung upwardly said spring is swung upwardly and inwardly to yieldingly urge said extension downwardly at the inner side of the bracket and maintain the arm raised and yieldingly urge the projection and arm downwardly at the forward side of the bracket when the arm is swung forwardly and downwardly.

2. In an awning frame, a bracket, an arm pivoted at one end to the bracket, said arm having a projection extending upwardly from the arm when the arm is lowered and extending inwardly from the bracket when the arm is raised, and an expanding spring pivoted at one end to the projection and at its other end to the bracket at a point above the pivoted end of the arm for yieldingly holding the arm in raised and lowered position by the expansion of the spring.

In testimony whereof I have affixed my signature.

ALEXIS F. GILLET.